United States Patent [19]

Kaneko et al.

[11] Patent Number: 5,285,298
[45] Date of Patent: Feb. 8, 1994

[54] COLOR DISPLAY APPARATUS

[75] Inventors: Shuzo Kaneko, Yokohama; Kazuo Yoshinaga, Machida; Kazuo Isaka, Tokyo; Takashi Kai, Hadano; Yomishi Toshida, Yokohama, all of Japan

[73] Assignee: Canon Kabushiki Kaisha, Tokyo, Japan

[21] Appl. No.: 914,633

[22] Filed: Jul. 17, 1992

Related U.S. Application Data

[63] Continuation of Ser. No. 385,151, Jul. 26, 1989, abandoned.

[30] Foreign Application Priority Data

Jul. 29, 1988 [JP] Japan .................. 63-187983
Jul. 30, 1988 [JP] Japan .................. 63-189663
Jul. 30, 1988 [JP] Japan .................. 63-189665
Jul. 30, 1988 [JP] Japan .................. 63-189668
Apr. 26, 1989 [JP] Japan .................... 1-104493

[51] Int. Cl.$^5$ ................... G02F 1/01; G02B 5/23
[52] U.S. Cl. .................................. 359/43; 359/288; 359/240; 359/45; 359/241; 353/31; 353/84; 430/20; 345/87
[58] Field of Search ............... 358/60, 61, 63, 69, 358/73, 56, 60; 350/353, 354, 355, 351, 350 R, 339 F; 353/31, 35, 84; 340/784; 430/20; 359/240, 241, 245, 43, 288

[56] References Cited

U.S. PATENT DOCUMENTS 4,202,010 5/1980 Hareng et al. .................. 358/56
4,675,699 6/1987 Kan et al. ........................ 346/76
4,726,662 2/1988 Cromack ......................... 350/345
4,965,591 10/1990 Kurabayashi et al. ............ 346/108

FOREIGN PATENT DOCUMENTS 2389955 1/1978 France .
2142180 9/1985 United Kingdom .

OTHER PUBLICATIONS

Hultquist "The Introduction of Negative Claim Limitations During Ex Parte Prosecution: 35 U.S.C. 112 and the Issue of Antecedent Support" JPTOS Mar. 1991 pp. 218–233.
Patent Abstracts of Japan, vol. 12, No. 162 (May, 1983) (P-703) (3010).

Primary Examiner—Robert J. Pascal
Assistant Examiner—Michael B. Shingleton
Attorney, Agent, or Firm—Fitzpatrick, Cella, Harper & Scinto

[57] ABSTRACT

A color image display apparatus includes: an image recording medium comprising a recording layer capable of selectively forming a light-scattering state and a transparent state, and a color filter having a pattern of plural color segments operatively associated with the recording layer, a light source, a viewing position, and display means for selectively sending to the viewing position a colored optical image composed of scattered light having passed through the recording layer. The display means may include direction means for directing light from the light source to be incident to the recording layer in a direction not normal to the recording layer.

30 Claims, 12 Drawing Sheets

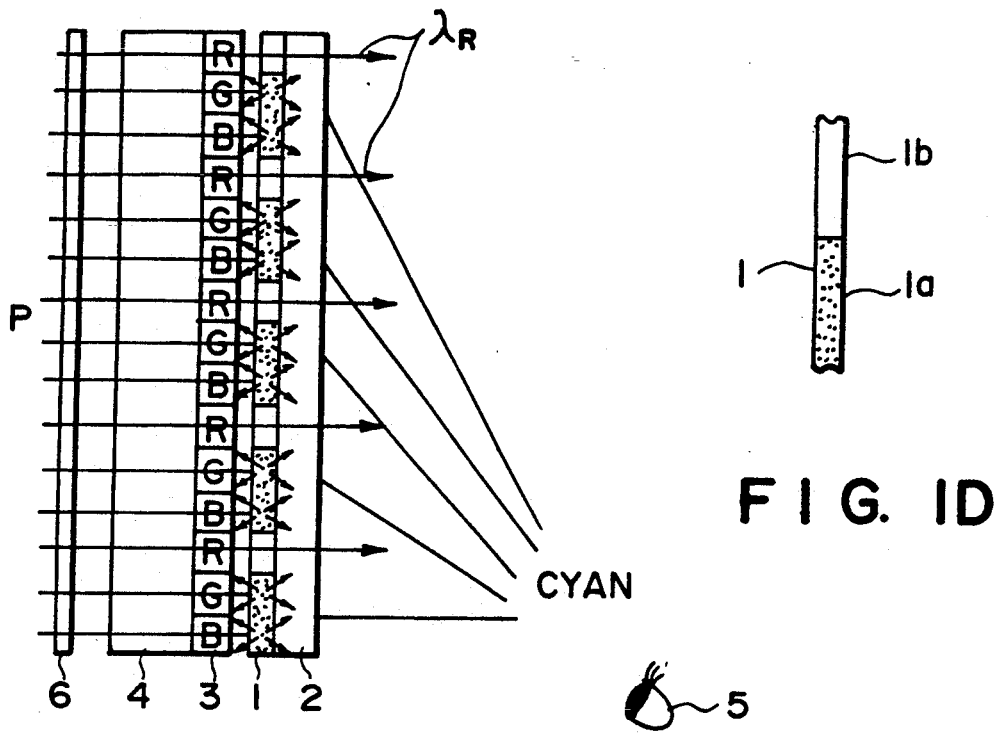
FIG. 1D
FIG. 1A
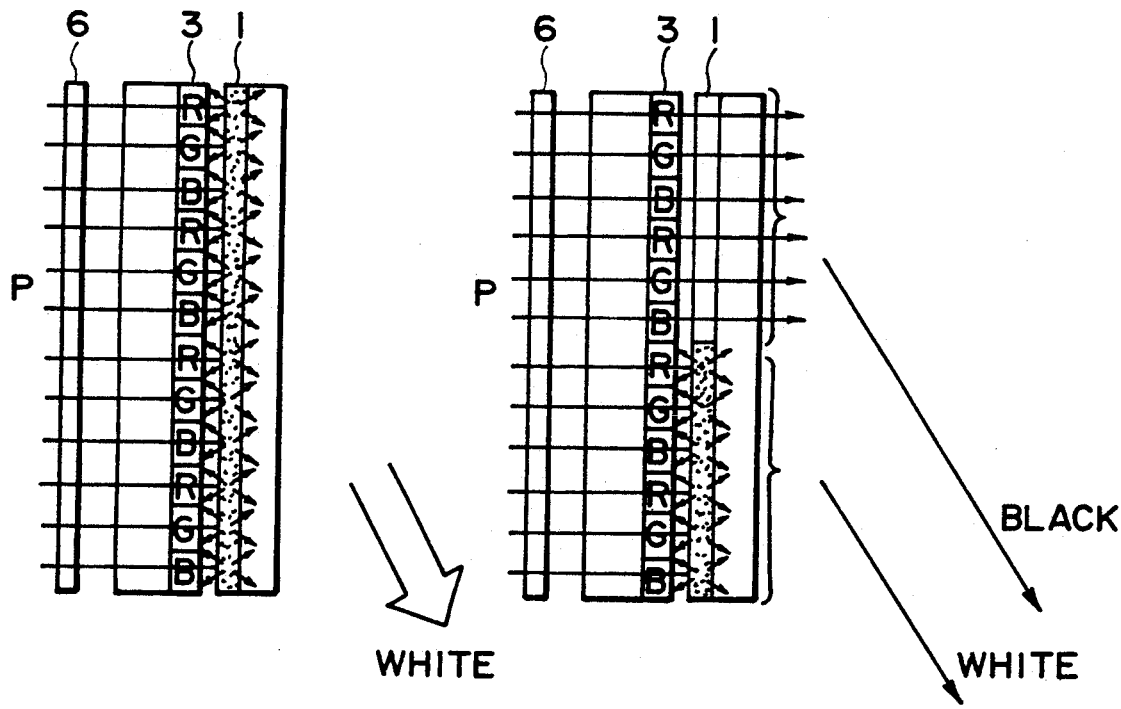
FIG. 1B
FIG. 1C

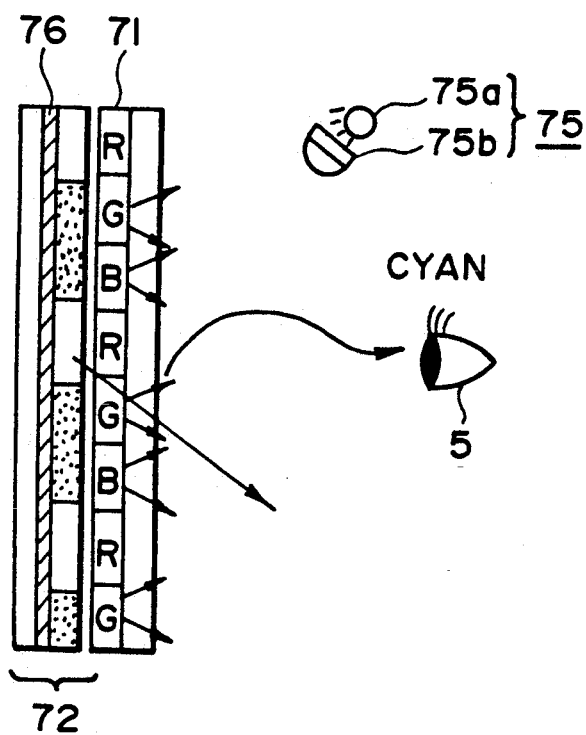
F I G. 15

COLOR DISPLAY APPARATUS

This application is a continuation of application Ser. No. 385,151, filed Jul. 26, 1989, now abandoned.

FIELD OF THE INVENTION AND RELATED ART

The present invention relates to a color display apparatus utilizing a difference in optical scattering state formed on a image recording medium composed of, e.g., a material showing a thermotropic mesomorphism or liquid crystal property.

Hitherto, motion picture outputs of a television receiver or a VTR (video tape recorder) or outputs through conversational operation with a computer have been displayed on a display monitor such as a CRT (cathode ray tube) or a TN (twisted nematic)-type liquid crystal panel. Further, fine images such as characters or figures outputted from a word processor or a facsimile machine have been displayed on a display monitor such as a CRT or a TN-type liquid crystal panel and/or printed out on paper to provide a hard copy.

A CRT provides a beautiful image for a motion picture output but causes a degradation in observability due to flickering or scanning fringes because of insufficient resolution in a still picture so that it is not suitable for a still picture display.

Further, a conventional liquid crystal display using a TN-liquid crystal as described above provides a thin apparatus but involves problems, such as troublesome steps including a step of sandwiching a liquid crystal between glass substrates, and a darkness of a picture providing an image which is hard to see.

Further, the CRT and TN-liquid crystal panel do not have a stable image memory characteristic, so that it is necessary to always effect beam scanning or application of pixel voltages even for output of still images as described above.

On the other hand, a hard copy image outputted on paper can be obtained as a stable memory image with a good storability, but frequent use thereof is accompanied with the necessity of a large space for filing, and the loss of resources caused by a large amount of disposal cannot be ignored.

Further, in order to display color images on hard copies, complicated handling of inks or developing agents is necessary.

SUMMARY OF THE INVENTION

An object of the present invention is to provide a display apparatus of a simple structure capable of easily and clearly displaying a still image, particularly a color still image, with a good contrast through simple operation.

According to the present invention, there is provided a color image display apparatus, comprising: an image recording medium comprising a recording layer capable of selectively forming a light-scattering state and a transparent state, and a color filter having a pattern of plural color segments operatively associated with the recording layer, a light source, a viewing position, and display means for selectively sending to the viewing position a colored optical image composed of scattered light having passed through the recording layer. The display means may comprise direction means for directing light from the light source to be incident to the recording layer in a direction at normal to the recording layer.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A-1C are schematic sectional views of an image recording medium for illustrating the principle of the display apparatus according to the present invention and FIG. 1D is a partially enlarged view of the recording layer of the recording medium.

FIGS. 13-17 are a schematic side sectional views of image recording media for illustrating the principle of the display apparatus according to the invention.

DESCRIPTION OF THE PREFERRED EMBODIMENTS

Figure 9:
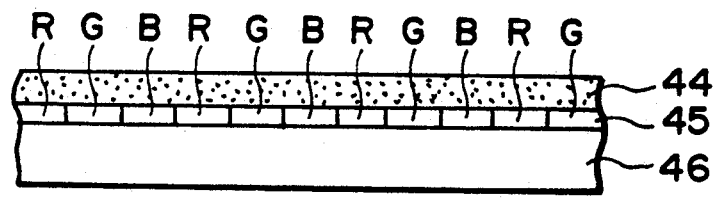
FIGS. 9 and 10 are partial sectional views illustrating other configurations of image recording media used in the invention.
Figure 10:
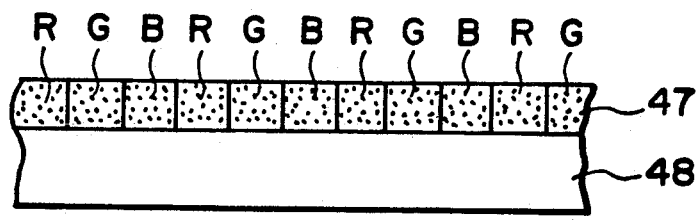

The image recording medium used in the present invention comprises a recording layer capable of selectively forming a light-scattering state and a transparent state, and a color filter having a pattern of plural color segments operatively associated with the recording layer. The image recording medium may be a combination of a recording medium (in a narrow sense) having such a recording layer generally disposed on a substrate and a color filter which is separate from the recording medium and is caused to be in a close laminated position on the recording medium during display. (The term "recording medium" may generally be used in the above-mentioned narrow sense hereinafter.) Alternatively, the color filter can be integrally laminated with the recording medium or can form a unitary layer also acting as a recording layer (FIGS. 9 and 10 described hereinafter). Accordingly, the term "operatively associated with the recording layer" used herein is intended to cover all the modes mentioned above of the color filter.

The recording layer may be a layer of any material capable of selectively forming a light-scattering state and a transparent state to form an image (written image) with different degrees of light-scattering characteristic, which comprise data corresponding to a color image to be displayed in combination with the color filter. The material constituting the recording layer may also be required to allow the erasure of such a written image. The recording layer may suitably comprise, e.g., a material showing a thermotropic mesomorphism (liquid crystal characteristic).

More specifically, the material showing a thermotropic mesomorphism has a property that a layer thereof is capable of causing a difference in optical scattering performance, i.e., a different degree of scattering of light which is incident to the layer. A representative example of the material may be a polymer liquid crystal as will be described below. Incidentally term "transparent state" used herein means a substantially non-scattering state whereby light incident to a recording layer in a particular direction is allowed to pass the layer while retaining a certain directionality.

Examples of a polymer liquid crystal showing thermotropic mesomorphism, i.e., a thermotropic polymer liquid crystal, may include a side chain-type polymer liquid crystal which comprises a main chain of a methacrylic acid polymer, a siloxane polymer, etc., and a mesogen or low-molecular weight liquid crystal unit in side chains thereof like pendants; and also a main chain-type polymer liquid crystal comprising a mesogen unit in its main chain, such as those of the polyester-type or polyamide-type, as used in the field of high-strength and high-modulus, heat-resistant fiber or resin.

These polymer liquid crystals may assume smectic phase, nematic phase, cholesteric phase or another liquid crystal phase or can also be a discotic liquid crystal.

Another class of polymer liquid crystals suitably used in the present invention may include a polymer liquid crystal showing ferroelectricity by introducing an asymmetric carbon atom to assume SmC* (chiral smectic C) phase.

Specific examples of the polymer liquid crystal used in the present invention are enumerated hereinbelow while other polymer liquid crystals can also be used in the present invention.

(I)

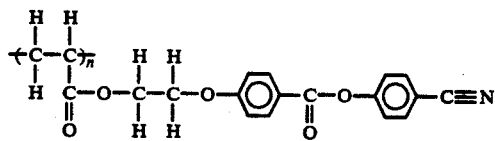

Mw = 18,000

Glass —75° C.— Liquid crystal phase (N) —110° C.— Iso.

N: nematic phase (II)

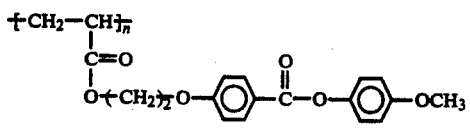

Glass —47° C.— Liquid crystal phase (N) —77° C.— Iso.

(III)

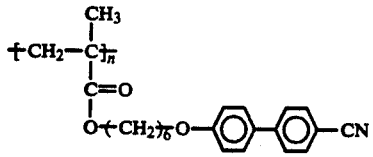

Glass —50° C.— Liquid crystal phase (Sm) —100° C.— Iso.

Sm: smectic phase (IV)

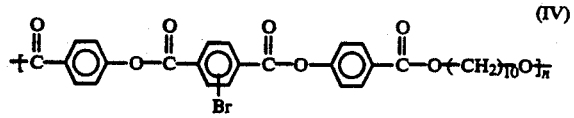

Glass —140° C.— Liquid crystal phase (Sm) —196° C.— Iso.

The above polymer liquid crystals may be used singly or in combination of two or more species.

Now, a principle process of forming a written image in a recording layer of a polymer liquid crystal is explained with reference to FIG. 7, which shows changes in scattering intensity of a polymer liquid crystal layer versus temperature, i.e., a heat-treating condition.

Figure 7:
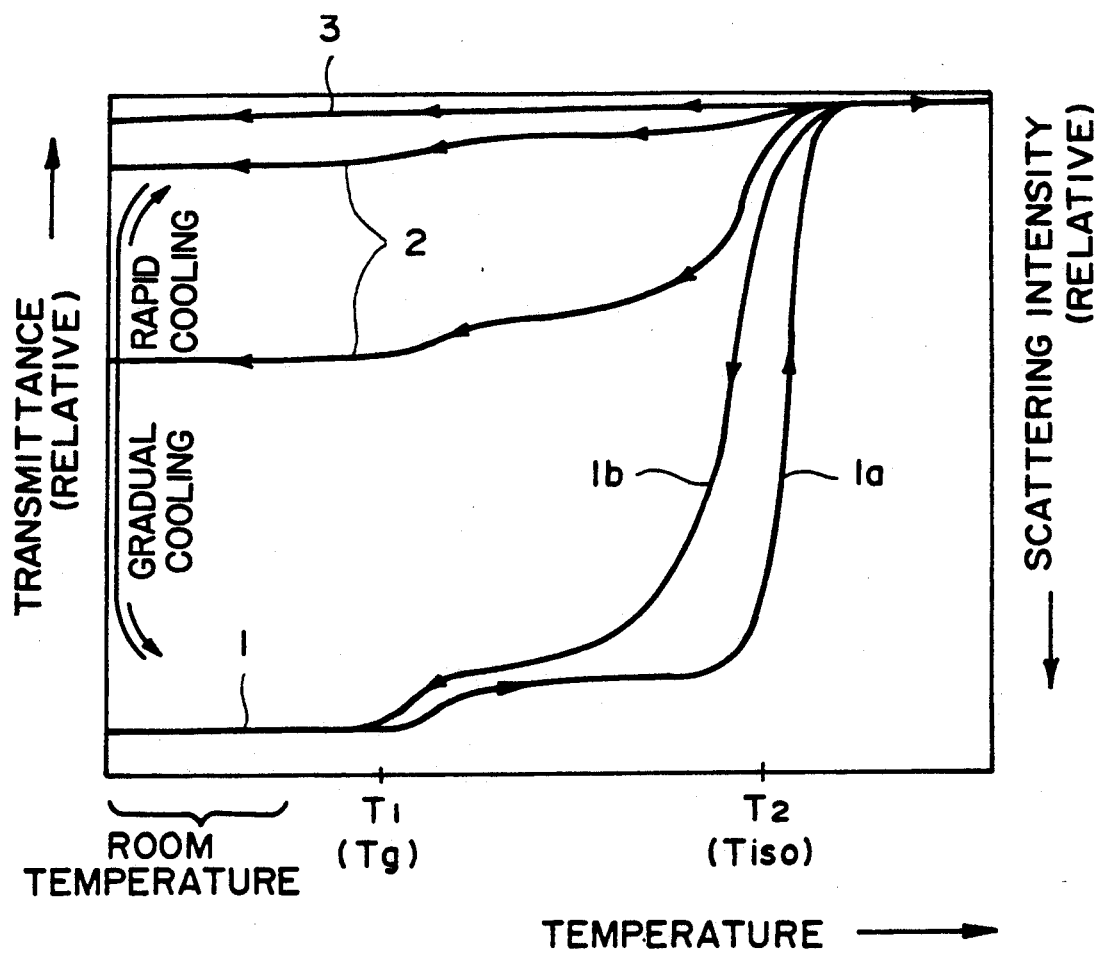
FIG. 7 is a diagram for illustrating an image recording principle used in the invention.

Referring to FIG. 7, the above-mentioned light-scattering state corresponds to a state 1. When the polymer liquid crystal layer in the state 1 is heated by a heating means, such as a thermal head or laser light, to a temperature above $T_2$ ($T_{iso}$=isotropic state transition temperature) along a path denoted by 1a and then rapidly cooled, a transparent state as shown by 3 similar to the isotropic state is fixed. Herein, "rapid cooling" means cooling at a rate sufficiently large as to fix the state before the cooling without substantial growth of an intermediate state, such as a lower-temperature liquid crystal phase. The thus-fixed transparent isotropic state is stable at a temperature below $T_1$ (Tg: glass transition point), such as room temperature or natural temperature.

Incidentally, such a rapid cooling of a heated part or segment of a polymer liquid crystal layer as described can be sufficiently realized by having a recording medium stand in air for natural cooling, e.g., where the recording medium comprises a recording layer in a thickness of 15 microns or below on a substrate of, e.g., PET (polyethylene terephthalate) in a thickness of several tens of microns to 100 microns, while the situation can vary depending on the thickness and/or structure of the polymer liquid crystal layer and the substrate.

On the other hand, if a portion of the recording layer heated to above $T_2$ to cause the state change of 1a is held at a liquid crystal temperature between $T_1$ and $T_2$ for a period of, e.g., 1 second to several seconds for the above-mentioned range of recording layer thickness, the recording layer increases the scattering intensity during the holding period as indicated by a curve 1b to be restored to the original scattering state 1 at room temperature. The resultant light-scattering state 1 is also stably retained at a temperature below $T_1$.

Further, if a portion of the recording layer having caused the state change 1a by heating is cooled while taking a liquid crystal temperature between $T_1$-$T_2$ for a period shorter than the above-mentioned period for restoration to the state 1, (e.g., about 10 milliseconds to 1 second for the above-mentioned recording layer thickness) as indicated by curves 2, an intermediate light-scattering state is obtained at room temperature. Such an intermediate light-scattering state is also stable at a temperature below $T_1$. Incidentally, the velocity of restoring to the original scattering state is larger at a temperature closer to $T_2$ in the liquid crystal temperature range. If a portion of the recording layer is held at a temperature within the liquid crystal temperature range for a relatively long period, the scattering state 1 can be restored without heating once into isotropic phase or regardless of the previous state.

As described above, the recording layer comprising a thermotropic polymer liquid crystal has a property of assuming at least three states including a film state below the glass transition temperature showing a stable memory characteristic, a liquid crystal state capable of being transformed into different degrees of optical scattering states, and an isotropic film state assuming an isotropic molecular alignment. By utilizing the property, image display can be effected, for example, in the following manner.

In order to form a written image, a recording layer in a highly light-scattering state 1 is subjected to a selective local heating corresponding to an image to be displayed, and the heated part or segment is rapidly cooled to assume a transparent state 3.

As a result, a distribution of non-heated parts in the state 1 and heated parts in the state 3 corresponding to an image to be displayed is formed in the recording layer to provide a written image. Thus, through such a heat-treatment, a recording layer comprising light-scattering parts and transparent parts is formed.

Further, if the entirety of such a recording layer having a written image therein is subjected to a state change along the path 1b shown in FIG. 7, the entire recording layer is restored to the state 1 to erase the written image. The resultant recording layer can be re-used for new image writing.

Further, by combining such a recording layer having a written image comprising light-scattering parts and transparent parts formed by a heat treatment with a color filter, it becomes possible to effect a color display as will be described hereinafter.

An image recording medium used in the present invention may be obtained by forming a recording layer comprising a layer of a material showing a thermotropic mesomorphism, such as a polymer liquid crystal, as described above on an appropriate substrate.

A polymer liquid crystal layer may be formed by dissolving or dispersing a polymer liquid crystal in an appropriate solvent to form a coating liquid, and applying the liquid onto a transparent substrate of a material, such as glass or resins including polyimide and PET (polyethylene terephthalate) and other materials, followed by drying to form a film in a thickness of preferably 15 microns or less, particularly 3-15 microns.

The solvent used herein may be a polar solvent, such as dichloroethane, dimethylformamide, cyclohexanone, tetrahydrofuran, acetone and ethanol; a non-polar solvent, such as benzene, toluene and cyclohexane; or a mixture of these, and may be appropriately depending on the material showing a thermotropic mesomorphism used.

In order to provide a more beautiful image, it is preferred that a polymer liquid crystal is added to a solvent in such a proportion that a clear or viscous solution thereof is formed after the addition and stirring. For example, in case where a polymer liquid crystal of the above formulas (I)-(IV) is singly dissolved in dichloroethane, it forms a white turbid micelle state at a concentration of 10 wt. %, but stably forms a transparent viscous solution at a relatively high concentration on the order of 15-25 wt. %. This tendency is observed also for other several types of polymer liquid crystals and combinations with another solvent. If such a transparent viscous solution is applied by means of an applicator, a wire bar, dipping, etc., onto a well washed substrate, such as glass or polyester and then held at the above-mentioned liquid crystal temperature, an optical scattering film having a higher uniformity can be obtained than in a case where a solution in the micelle state is similarly applied for film formation.

Further, in order to provide the recording layer with a stabler light-scattering performance, it is preferred to hold the substrate coated with the coating liquid at a liquid crystal temperature (75°-110° C.) for a certain period in the stage of evaporation of the solvent or after the evaporation.

Next, the principle of color image display according to the present invention will be explained.

Color image display according to the present invention may be effected by disposing an image recording medium comprising a recording layer so that the recording layer 1 is adjacent to a color filter 3 and illuminating the recording layer 1 through a Fresnel lens 6 and the color filter 3 from a backlight (P) disposed on the opposite side of a viewing position 5 with respect to the recording medium as shown in any of FIG. 1A-1C.

The image recording medium shown in these figures has a structure comprising the recording layer 1 of a material showing a thermotropic mesomorphism as described above formed on a transparent substrate and is already provided with a written image comprising light-scattering parts 1a and transparent parts 1b (FIG. 1D) which have sizes and positions corresponding to color segments of three primary colors R, G and B of the color filter 3.

The written image comprising the light-scattering parts 1a and transparent parts 1b has been formed by subjecting the recording layer 1 to heating and cooling locally selectively depending on recording image data corresponding to a color image to be displayed according to the principle described hereinbefore.

Further, it is possible to provide a color display part with a density gradation by providing the light-scattering part with different degrees of light-scattering states.

In some cases, a written image can be formed by a combination of only light-scattering parts having different degrees of light-scattering states in addition to a combination of a light-scattering part and a transparent part as described above.

The color filter 3 comprises color segments of three primary colors, red (R), green (G) and blue (B), generally in a thickness of 0.1-5 microns, formed on a transparent substrate 4.

In the color image formation using a combination of the color filter 3 and the recording layer 1 having a written image therein, as shown in FIG. 1A for example, the recording layer 1 having a written image is disposed adjacent to the color filter 3 so that a light flux having passed through an R segment of the color filter 3 is caused to go straight on through a transparent part or segment of the recording layer 1, and light fluxes having passed through G and B segments are caused to be scattered at light-scattering parts, whereby an image in cyan which is complementary to R (red) is displayed.

Further, in the case shown in FIG. 1B, the recording layer 1 has been subjected to image writing and disposed adjacent to the color filter 3 so that all the light fluxes having passed through the R, G and B segments are scattered by light-scattering parts of the recording layer 1, whereby an image in white (W) which is complementary to black (BK) is displayed.

Further, as shown in an upper half of FIG. 1C, the recording layer 1 may be subjected to image writing and disposed adjacent to the color filter 3 so that all the light fluxes having passed through the R, G and B segments are caused to go straight on through a transparent part of the recording layer 1, whereby an image in black (BK) which is complementary to white (W) is displayed.

In the embodiment shown in FIGS. 1A–1C, the recording layer 1 is disposed adjacent to the color filter 3 with a spacing therebetween. However, the recording layer 1 can be in close contact with the color filter 3 or can be directly formed on the color filter 3 by application of a polymer liquid crystal as described above. Further, in this embodiment, the color filter 3 is disposed on the light source side, i.e., in front of the image recording medium as viewed from the light source. However, the color filter 3 and the image can be disposed in a reverse order.

According to a color display system as described above wherein a light flux in a color is caused to pass through a color filter and an image recording medium straight on while retaining its directionality and another light flux in a color complementary to the above color is used for display, a color image display in a high contrast can be provided and further color data input for writing an image in the recording layer can be simplified.

Hereinbelow, some embodiments of the apparatus according to the present invention will be explained with reference to the drawings, wherein a polymer liquid crystal is used as a material showing a thermotropic mesomorphism in a recording layer.

It is to be understood however that the present invention is not restricted to the following embodiments. For example, the image recording medium can be composed of any material which can represent image data (a written image) necessary for color image display with a difference in light-scattering state. Further, in the following embodiments, a written image is formed by forming a transparent part in an area of a recording layer in a light-scattering state, but it is also possible to form a written image by forming a light-scattering part in an area of a recording layer in a transparent state.

FIRST EMBODIMENT

Figure 2:
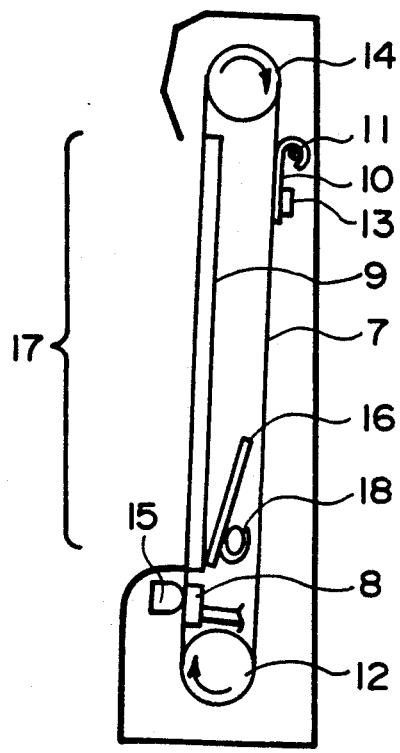
FIGS. 2, 5A, 11A and 12A are schematic side views of embodiments of the apparatus according to the invention.

FIG. 2 is a schematic side view showing major parts of an embodiment of the apparatus according to the present invention.

The apparatus includes an upper drive roller 14 and a lower roller 12 at opposed parts, which constitute a means for holding and conveying an image recording medium 7.

The image recording medium 7 is provided in the form of an endless belt, wrapped around the rollers 12 and 14 and moved in a plane accompanying the rotation of a drive roller 14 which is driven by a motor (not shown). An area of the image recording medium 7 provided with a written image, i.e., carrying data for color image display, is conveyed to a display position or zone 17 to form an image display face for color image display.

On the back side of the image recording medium 7 at the display position 17, a color filter 9 is disposed. The color filter 9 may comprise color segments in various shapes, such as stripes or a mosaic. The formation of a written image corresponding to a color image to be displayed may be effected corresponding to a type of the color filter 9 used according to the above-described principle.

In the neighborhood of the drive roller 14 is disposed an erasure heater 10 for erasing a written image on the image recording medium comprising a halogen lamp 11 and a temperature sensor 13.

Further, in the neighborhood of the lower roller 12 are disposed a thermal head 8 and a platen 15 for forming a written image on the image recording medium 7.

Incidentally, the formation of a written image on the image recording medium can be effected by any means by which it is possible to form a written image comprising a difference in light-scattering state corresponding to a color image to be displayed, inclusive of a laser for beam or spot illumination in addition a thermal head as described above.

In a specific embodiment, the image recording medium 7 was formed by applying a solution of the polymer liquid crystal of the above-mentioned formula (I) at a concentration of 20% in dichloroethane onto a transparent substrate of polyethylene terephthalate, followed by drying in an oven for 15 minutes at 85° C., to provide an 8 micron-thick recording layer, and by forming the coated substrate into an endless belt having the recording layer on its inner side.

In the apparatus, the polymer liquid crystal layer constituting the image forming medium 7 can be directly rubbed or scanned by the thermal head 8 for repetitive image formation as the polymer liquid crystal has sufficient heat resistance and film strength. It is however possible, as desired, to provide a protective layer of, e.g., polyimide, aramide or a fluorine-containing resin on the surface, e.g., by lamination. For example, a protective layer of aramide resin may be formed in thickness of about 3.5 microns or less.

Color image display may be effected by using the apparatus as follows.

First, recording data corresponding to a color image to be displayed (i.e., a written image) is written in the recording layer (not shown) of the image recording medium 7.

For the writing, the drive roller 14 is driven in the direction of an arrow by a motor (not shown), and the thermal head 8 is supplied with a writing signal as data processed by, e.g., a computer, corresponding to a color image to be displayed, so as to locally selectively heat the recording layer of the recording medium 7 according to the writing signal, whereby the heated part of the recording layer forms a transparent imagewise pattern.

The writing signal for writing onto the image recording medium 7 is matched or aligned so as to allow a color image display according to the principle explained with reference to FIG. 1 when the written image on the image recording medium 7 is stopped and superposed on the color filter 9 at the display position 17. Accordingly, the writing signal may be appropriately controlled corresponding to the configuration of color segments in the color filter 9.

Figure 3:
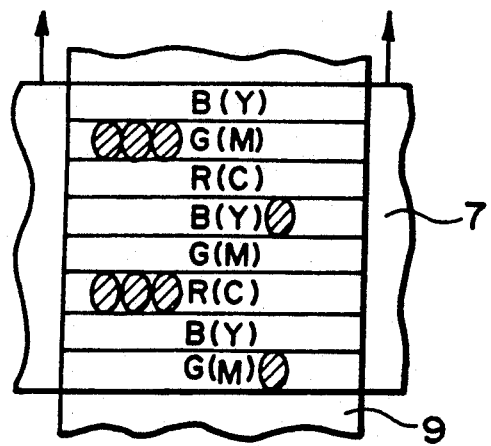
FIG. 3 is a partial schematic plan view illustrating an example of a recorded image.

For example, in case where the image recording medium 7 and the color filter 9 are superposed in a state as shown in FIG. 3, a pixel (having a size equal to almost three times the width of a color segment) for displaying magenta (M) on the recording medium 7 is provided with a transparent part (a hatched part in the figure) corresponding to a green (G) segment of the color filter 9; a pixel for displaying yellow (Y) is provided with a transparent part corresponding to a blue (B) segment;

and a pixel for displaying cyan (C) is provided with a transparent part corresponding to a red (R) segment.

The color filter 9 in this embodiment comprises stripe color segments in blue (B), green (G) and red (R). However, the configuration of color segments may also be in mosaic. Further, another set of primary colors of yellow (Y), magenta (M) and cyan (C) may also be used.

Such a color filter may be provided by forming a film of color segments at an appropriate density, e.g., 12 lines or dots per mm by dot printing, etc. Further, a color filter 3 as shown in FIG. 1 may be formed by direct printing on a substrate or by applying a film comprising color segments prepared in advance onto a substrate 4.

Referring again to FIG. 2, the recording layer (not shown) of the image recording medium 7 is disposed to directly contact the color filter 9 so that the substrate (not shown) of the image recording medium 7 is not present between the recording layer and the color filter 9, whereby image display is effected without causing a lowering in resolution due to a viewing angle.

The movement of the image recording medium 7 is stopped when the area of the image recording medium 7 having a written image is moved to the display position 17 and the written image is aligned to satisfy a positional relationship with the color filter 9 which allows a desired color display.

At the display position 17, the written image formed on the image recording medium 7 is illuminated through the color filter 9 from an illumination lamp 18 disposed behind the color filter 9.

A part of the illuminating light goes straight on through a transparent part formed by heat-writing of the recording layer and another part of the illuminating light is scattered at a non-heated part (light-scattering part) of the recording layer according to the principle explained with reference to FIGS. 1A-1D.

In this instance, a Fresnel lens 16 (or a spherical or aspherical lens) is disposed in front of the illumination lamp 18 so that illumination light from the lamp 18 is caused to be incident to the recording medium 7 in a direction not normal to the display face of the recording medium 7 at the display position 17. As a result, a viewer rightly facing the display face does not observe a light flux having linearly passed through a transparent part of a written image on the image recording medium but observes scattered light fluxes emitted from light-scattering parts of the recording medium 7. Thus, the color image which is displayed is of a color complementary to the color of the light flux linearly passing through the recording medium 7. The angle of deviation of incident light from the normal to the recording layer is such that a non-scattered light having passed through the recording layer will not reach the viewer, and is preferably 10-70 degrees from the normal.

In the apparatus according to the present invention, an alignment operation for alignment a written image formed on the image recording medium with the segment pattern of the color filter is important so as to satisfy a positional relationship allowing a desired color display in order to provide a good color display.

Such positional alignment can be effected sufficiently and reliably, e.g., in the following manner.

Figure 4A:
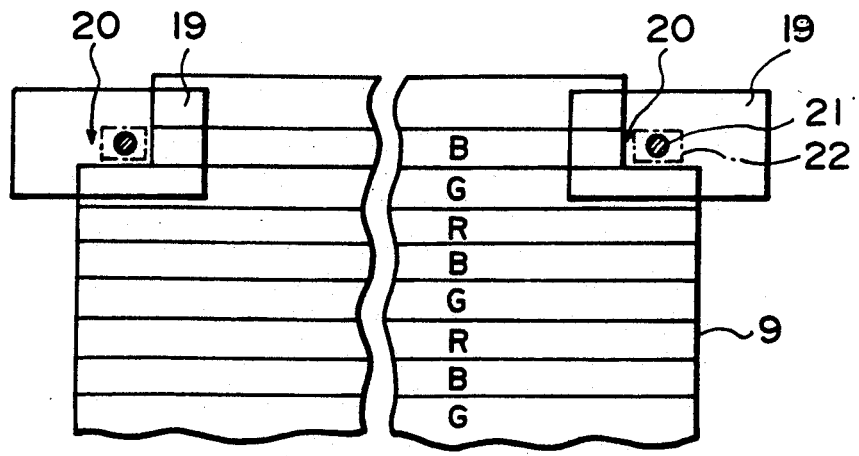
FIGS. 4A-4C and FIGS. 6A-6B are schematic views for illustrating a mechanism of alignment of a color filter and a recording layer used in the apparatus of the invention.
Figure 4B:
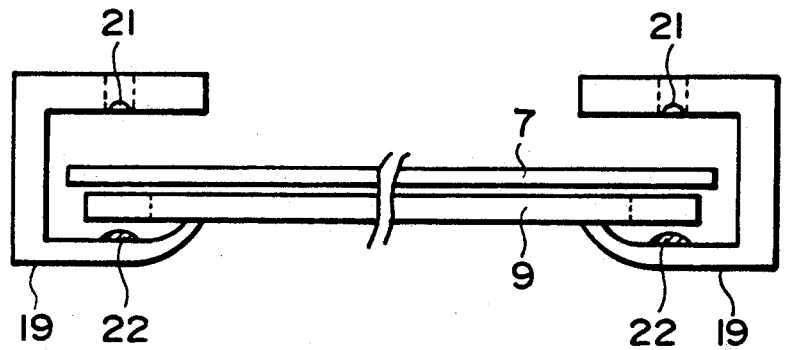
Figure 4C:
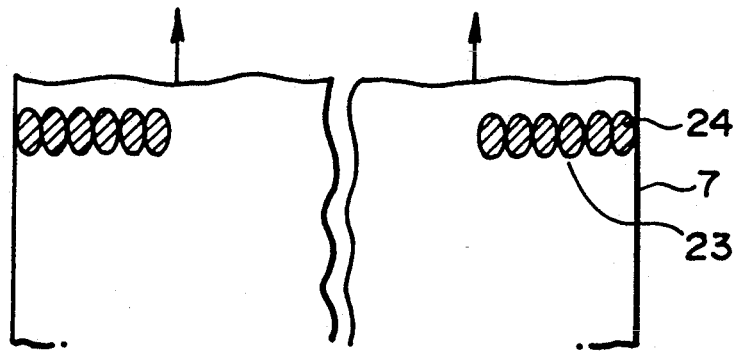

Explanation will be made with reference to, e.g., a case where a color filter having color segments in the form of stripes extending perpendicularly to the moving direction of an image recording medium 7 is used. Referring to FIGS. 4A-4C, a cut 20 is formed at a part of a leading color segment (blue (B) in this embodiment) in the color pattern of a color filter 9, and a photocoupler 19 is disposed at the cut 20 so that its photo-emission element 21 and photo-receiving element 22 face each other as shown in a plan view, FIG. 4A. FIG. 4B shows a side view of this state.

On the other hand, as shown in FIG. 4C, a transparent part 23 for alignment is necessarily formed on the image recording medium 7 at a time when a part forming a written image of the image recording medium 7 to be aligned with a blue (B) segment of the color filter 9 at the display position arrives at a writing means, i.e., at a time when the part of the image recording medium 7 passes by the writing means during the formation of a written image on the image recording medium 7. Such a transparent part 23 is formed at a part of the image recording medium 7, such as a leading edge of the recording medium, which does not affect a display image. A desired written image is also formed by the thermal head 8 and moved to the display position 17.

As a result, when the written image arrives at the display position 17 and the thus-formed transparent part 23 of the image recording medium 7 arrives at the position of the photo-coupler 19, a maximum quantity of light-rays emitted from the emission element 21 is detected by the receiving element 22, and the information is fed back to a control means for a drive motor (not shown) connected to the drive roller 14 so as to stop the image recording medium 7, whereby a desired positional relationship between the written image and the color filter 9 is automatically attained.

The location of the photo-coupler and the location of the transparent part for alignment, and mode of preparation of these members may be appropriately modified as desired.

Figure 6A:
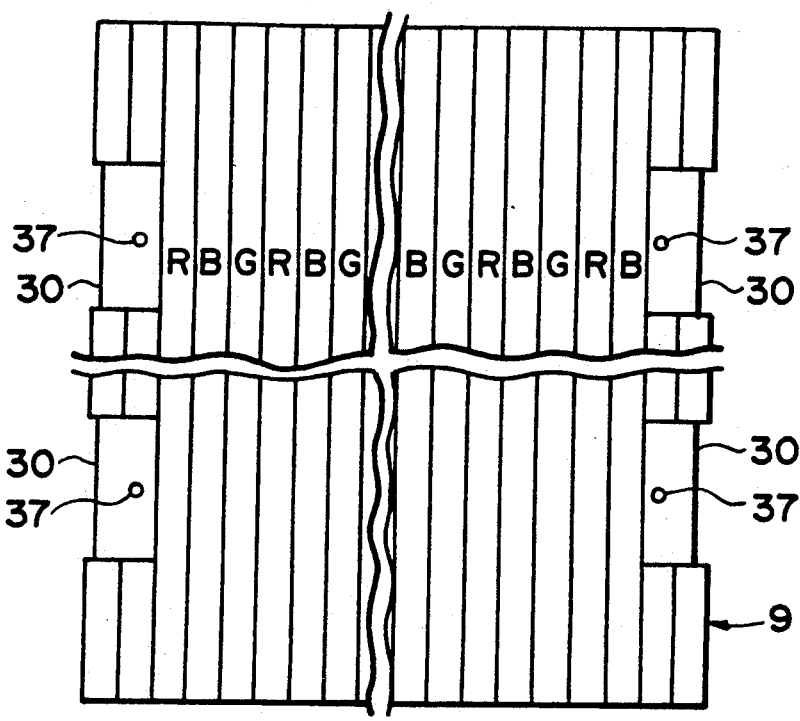
Figure 6B:
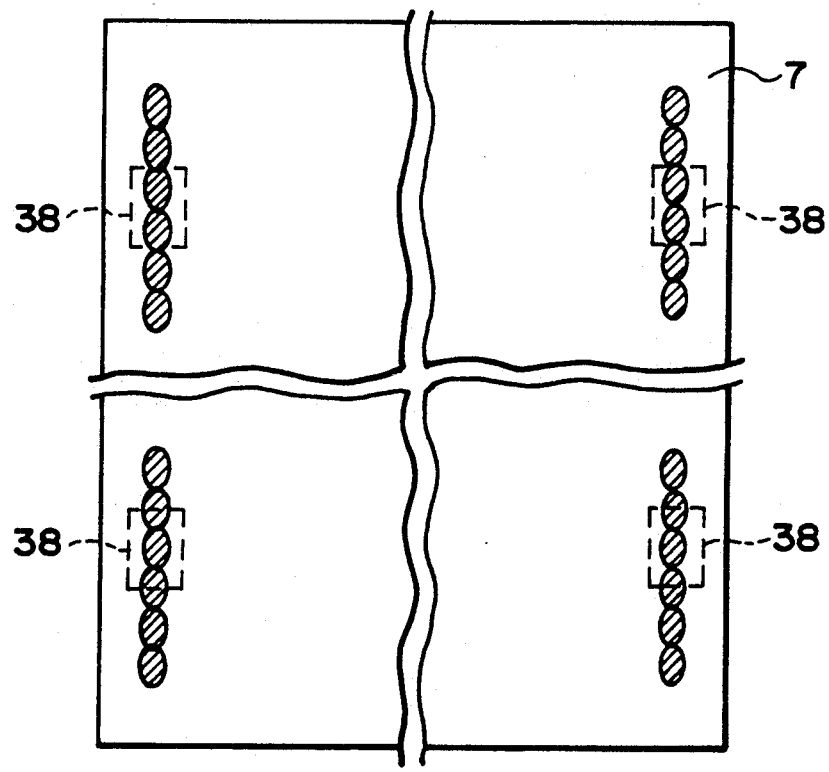

Further, in case where a color filter has color segments in the form of stripes extending in parallel with the moving direction of an image recording medium 7 is used, an alignment may be performed in a manner as explained with reference to FIGS. 6A and 6B.

Cuts 30 are formed at, e.g., four parts of a color filter 9, and at the cuts 30, light-emission elements 37 such as LEDs or laser diodes are disposed together with lenses, etc., as desired. On the other hand, an image recording medium 7 is provided with light receiving elements 38 at four parts on the transparent substrate side thereof corresponding to the above-mentioned four parts of the light-emission elements.

At the time of forming a written image on the image recording medium 7, the written image is formed while the position of the written image is controlled with respect to the light-receiving elements 38 so as to correspond to a positional relationship between the light-emission elements 37 and the respective color segments of the color filter 9. When the thus-written image is moved to be on the color filter 9 at the display position, light rays are emitted from the light-emission elements 37 and the image recording medium 7 is stopped at a position where the quantities of the four light fluxes received by the four light-receiving elements all assume a maximum, whereby a good alignment between the color filter and the written image can be effected automatically. The number and configuration of the units comprising the combination of a light-emission element and a light-receiving element may be appropriately modified as desired.

Incidentally, in the alignment between the color filter 9 and the written image formed in the recording layer 1, it is not necessary that the color segments in each color and the transparent parts for displaying a complementary color are in accurate alignment with each other horizontally as shown in FIG. 1, but the relative positions of these parts may be modified as desired so as to provide a good image quality as viewed from a viewing position in front of the display face. In case where a spacing is present between the color filter and the image recording medium, for example, an image display with a better contrast can be obtained by slightly shifting the recording layer 1 carrying a written image upwardly in FIG. 1 relative to the color filter 3 so as to aid the linear or non-scattering transmission of a light flux which is expected to go straight on through the color filter and the recording layer.

On the other hand, referring again to FIG. 2, the written image on the image recording medium 7 can be erased by the erasure heater 10 having the halogen lamp 11 as the heat source, and the resultant erased area of the image recording medium can be used again for the above-mentioned color image display.

More specifically, after a desired color image display, the drive roller 14 is again rotated in the direction of the arrow to drive the area of the image recording medium 7 carrying the written image to the position of the erasure heater 10.

The power of the halogen lamp 11 in the erasure heater 10 may be controlled depending on the output from the temperature sensor 10 so as to provide temperatures of about 115° C. in the vicinity thereof and about 80° C. at the remotest position therefrom when the lamp 11 is turned on.

Accordingly, the area of the recording layer carrying a written image arriving at the neighborhood of the halogen lamp 11 of the erasure heater 10 is heated to about 115° C. to cause a phase transition along the path 1a to be transparent entirely.

Further, the transparent area of the recording layer is moved along the erasure heater 10 so that the temperature thereof is gradually lowered. As a result, the heated transparent area of the recording layer is entirely transformed into a white liquid crystal state, i.e., being restored to the state before the writing.

In this particular embodiment, the erasure heater 10 provides a minimum temperature of at least 75° C. on its surface contacting the image recording medium and has a width of 50 mm in the moving direction of the image recording medium.

In an actual operation of the apparatus explained with reference to the figures, a stable color image display could be effected for more than 500 repeated cycles of the color image display and the erasure of an image written in the image recording medium. Further, clear image writing, color image display and erasure of the written image could be sufficiently effected even when the moving speed of the image recording medium was set to about 40 mm/sec.

The above-mentioned various operation parameters may be modified as desired when another structure of image recording medium is used.

In the illustrated apparatus according to the present invention, the thermal head 8 was of a multi-element type, but an ordinary serial thermal head can be used instead thereof for image writing.

Further, it is possible to provide a display image with a density gradation by changing the magnitude or duration of a voltage pulse applied to respective dots of the thermal head.

It is also possible to provide the apparatus of the present invention with a mechanism for preventing a lateral deviation of the image recording medium as desired.

SECOND EMBODIMENT

Figures 5A, 5B:
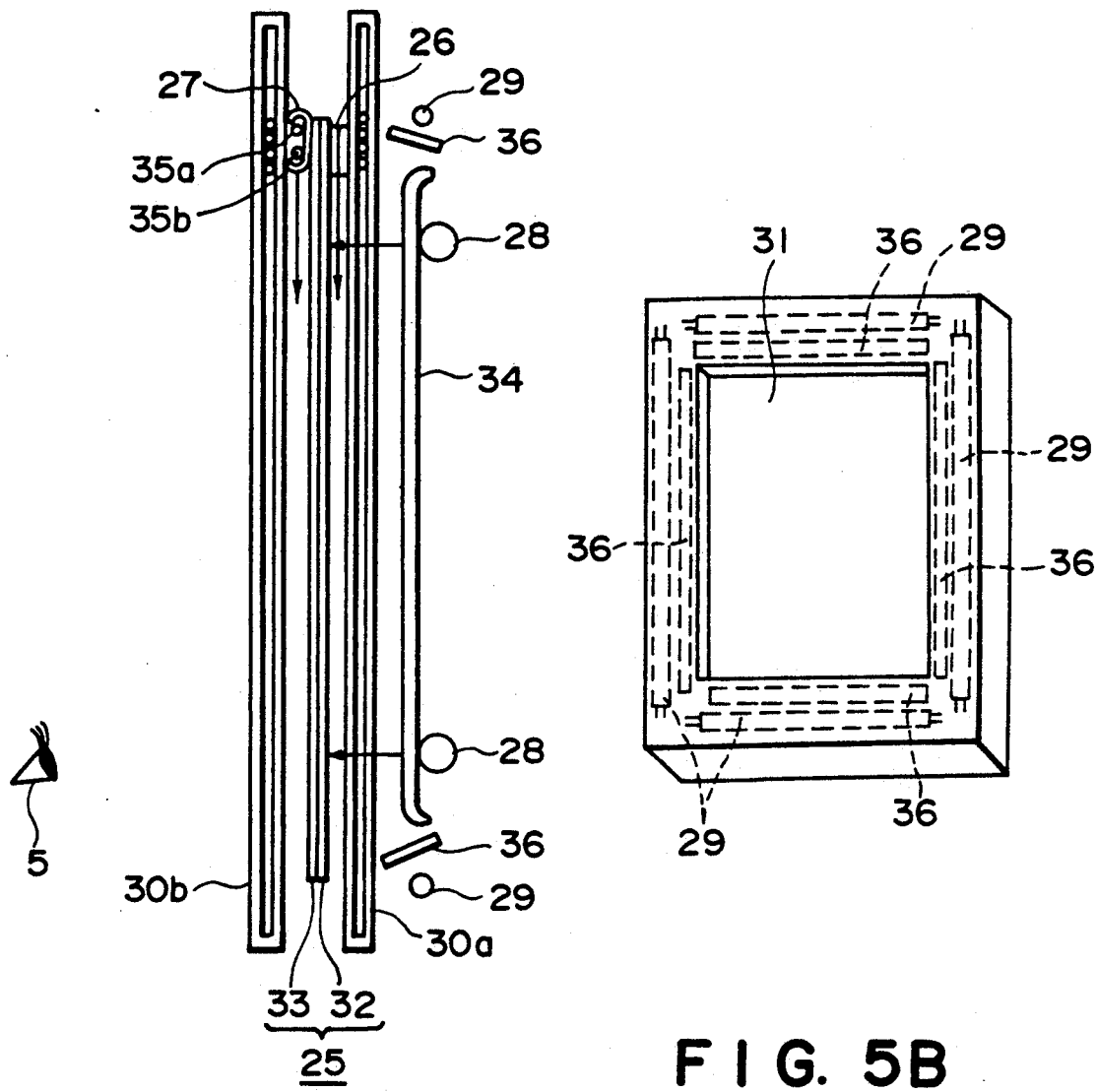
FIG. 5B is a front-side perspective view of the apparatus shown in FIG. 5A.

FIG. 5 shows another embodiment the apparatus according to the present invention.

The apparatus of this embodiment includes a fixed image recording medium 25 comprising a polymer liquid crystal layer (recording layer) 32 and a transparent substrate, and a thermal head 26 and an erasure heater 27 which are moved.

Hereinbelow, an operation for image display by using the apparatus will be briefly described.

(1) The thermal head 26 is returned to its home position.

(2) The thermal head 26 is driven in the direction of an arrow along the support 30a to form a transparent pattern (a written image) on the image recording medium 25.

(3) A color filter 34 is caused to be in the vicinity of or in contact with the image recording medium 25 having the transparent pattern by pressing means 28.

(4) The color filter 34 is finely adjusted vertically and/or laterally by using a drive means (not shown) therefor and a positional alignment detection method as described with reference to FIG. 4 or FIG. 6 so that the color pattern comprising color segments of the color filter and the above-formed transparent pattern are aligned with each other.

(5) An illumination lamp 29 is turned on as desired to effect a color image display through a Fresnel lens 36.

(6) The illumination lamp 29 is turned off.

(7) The color filter 34 is moved away from the image recording medium 25.

(8) A halogen lamp 35b is in the image erasure heater 27 turned on and the heater 72 is slowly moved in the direction of an arrow along a support member 30b and in contact with the transparent substrate 33 side of the image recording medium 25 so that the image recording medium 25 assumes a temperature above Tiso ($T_2$) in the neighborhood of the halogen lamp 35b and a liquid crystal temperature of the polymer liquid crystal used in other major parts facing the image erasure heater 27 with a temperature detection means (not shown).

The image-erasure heater 27 as erasure means comprises two halogen lamps 35a and 35b of which the remaining lamp 35a is turned on when the heater 27 is moved upward for subsequent image erasure.

THIRD EMBODIMENT

In this embodiment, a polymer liquid crystal layer 44 as described above was directly applied on a color filter 45 as shown in FIG. 9. Stripe color segments R, G and B each in a width of 125 microns are formed on a PET film substrate 46 to form an image recording medium integral with a color filter.

Figure 8:
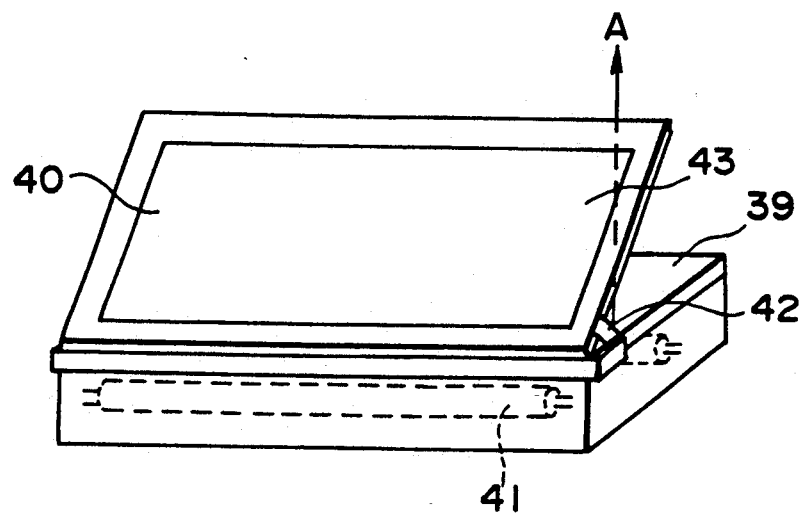
FIG. 8 is a perspective view of another apparatus embodiment of the invention.

The medium thus formed was subjected to color image writing by means of a thermal printer having a thermal head with 8 dots/mm so that the written image and the color segments were in a good alignment. The medium was set on an image holding medium 43 in an apparatus according to the present invention as shown in FIG. 8 so as to provide a display face 40 illuminated through a Fresnel lens from a light source 41, which was then turned on to provide an incident light flux A going straight on. The angle of the image holding member and thus the image recording medium was variably controlled by an angle-adjusting member 42.

On the other hand, a recording medium as shown in FIG. 9 was prepared by print-coating a transparent substrate 48 with inks comprising a polymer liquid crystal together with dyes of R, G and B, respectively to form a color filter and recording layer 47.

The recording medium shown in FIG. 10 was subjected to image writing and color image display in the device shown in FIG. 8 similarly as the medium shown in FIG. 9, whereby clear color image display could be similarly effected.

FOURTH EMBODIMENT

The apparatus of the present invention may be provided with a light-absorbing member, such as one having a matted black surface, disposed behind the image recording medium at the display position, so as to absorb or mask stray light rays or direct light flux from the light source which causes glare or dazzling sensed by a viewer. As a result, it is possible to provide a high quality color image which is mild and easy to see.

Figure 11A:
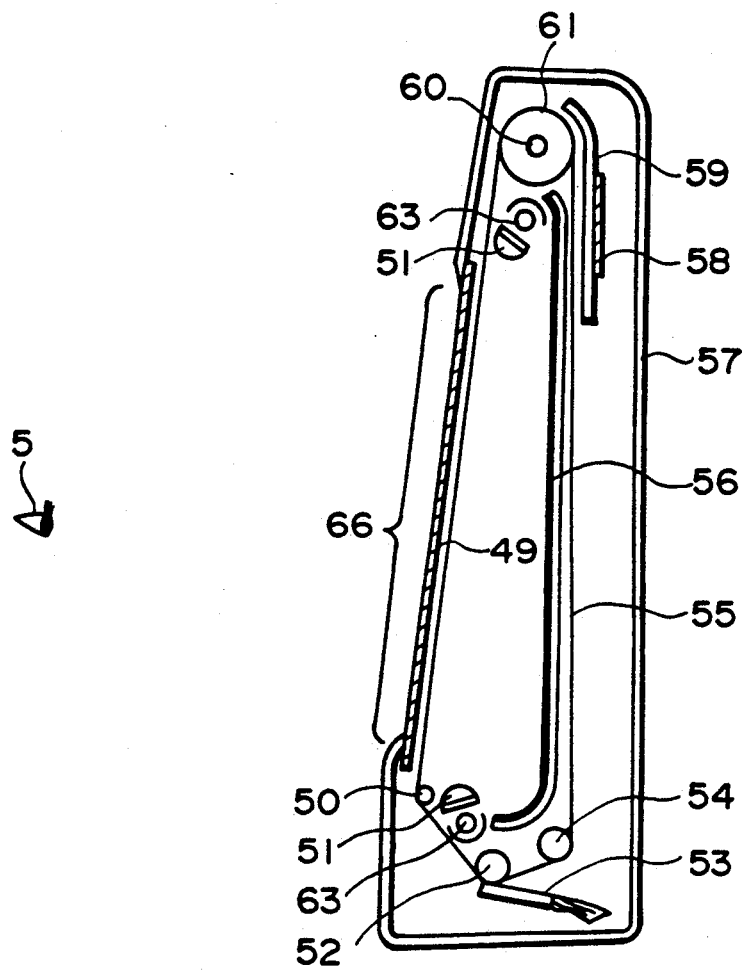
Figure 11B:
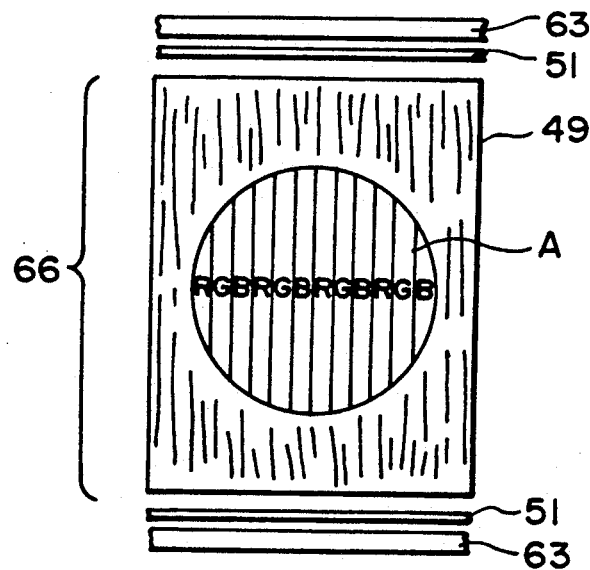
FIG. 11B is a partially enlarged schematic front view of the apparatus embodiment shown in FIG. 11A.

Such an embodiment comprising a light-absorbing member behind an image recording medium at a display position is illustrated in FIGS. 11A and 11B.

The apparatus uses an image recording medium 55 which is the same as the one used in First embodiment except that the recording layer has a thickness of 10 microns and assumes a form of endless belt comprising the recording layer on its outer side and the substrate on its inner side.

The image recording medium 55 is wrapped around rollers 50, 52, 54 and 61, and moved in a plane at a prescribed speed at the time of image writing or others accompanying the rotation of a drive roller (platen roller) 52 which is driven by a motor (not shown).

An area of the image recording medium 55 provided with a written image, i.e., carrying data for color image display is conveyed to an image display position to effect color display.

On the outer side (the side closer to a viewer 5) of the image recording medium at the display position, a color filter 49 is disposed. In this embodiment, the color filter 49 comprises stripe color segments extending longitudinally (in the vertical direction in the figure) and disposed at a pitch of 125 microns.

A halogen lamp 60 is stored in a heat roller 61, adjacent to which a warming member 59 carrying a planar heater 58 applied thereto is disposed. The heat roller 61 and the warming member 59 are equipped with temperature sensors (not shown), the outputs of which are fed back to the heat roller 61, halogen lamp 60 and warming member 59, so that parts of the image recording medium passing by these positions are heat-treated under prescribed conditions. More specifically, the temperatures of these parts may be controlled so as to erasure an image written on the image recording medium according to the principle of erasure of a written image explained with reference to FIG. 7.

The platen roller (drive roller) 52 and a thermal head 53 are disposed at a lower part of the apparatus for effecting thermal writing of a desired image on the image recording medium. In this embodiment, the thermal head 53 used is one for heating at 8 dots/mm capable of writing dots at a pitch corresponding to the pitch of arrangement of stripe color segments in the color filter 49.

In this apparatus, an illumination light source 63 and a cylindrical lens 51 are disposed outside the background region of a written image to be displayed moved to the display position, so that no light flux passing directly from the light source is observable to a viewer. Further, on the backside of the entirely of the image recording medium at the display position, a black matted light-absorbing plate 56 is disposed so as to constitute the background of an image to be displayed. As a result, it is possible to absorb stray light rays which are unnecessary in the apparatus or provide ill effects to satisfactory image observation, whereby satisfactory and high-quality images free of glare or dazzling can be observed.

The light-absorbing plate 56 may be formed by coating the display side surface of a plate of, e.g., metal or plastic, with an ordinary matting agent containing carbon or other black particles. The surface may have an optical density of 1.0 or higher, preferably 1.2 or higher.

Further, an illumination unit comprising an illumination light source 63 and a cylindrical lens 51 is disposed both at an upper part and a lower part of the apparatus in the direction of extension of the stripe color segments R, G and B as shown in FIG. 11B with indication of a partially enlarged part A of the color filter 49, so that the illumination light fluxes from the illumination units are incident to the color filter 49 in a direction almost perpendicular to the parallel arrangement of the stripe color segments. As a result, crosstalk between colors of adjacent color segments can be avoided to provide a better lateral viewing angle characteristic.

FIFTH EMBODIMENT

Figure 12A:
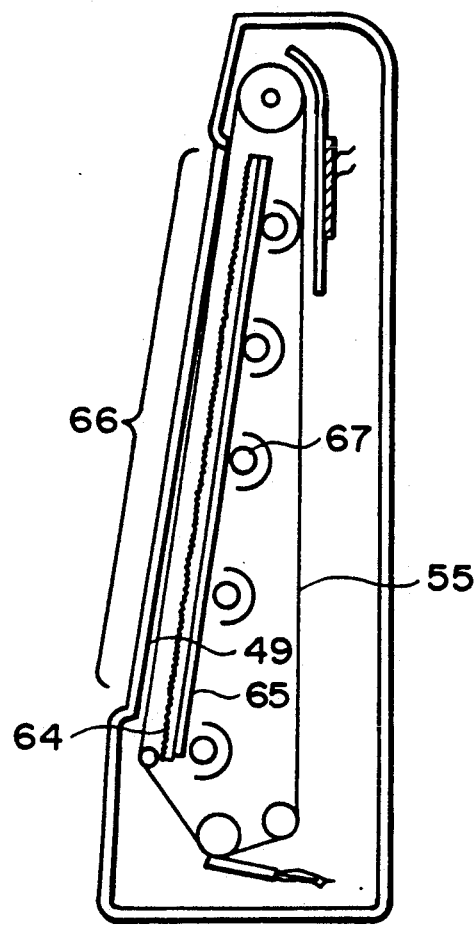
Figure 12B:
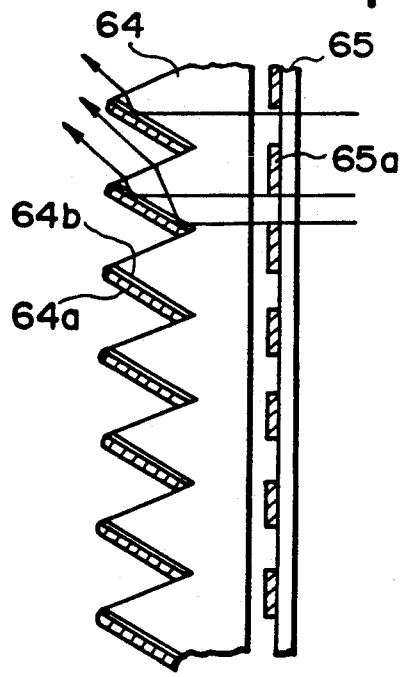
FIGS. 12B and 12C are enlarged partial views of FIG. 12A.
Figure 12C:
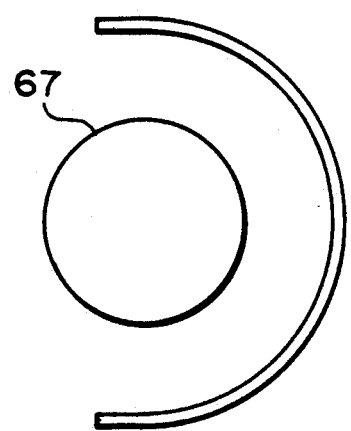

FIG. 12 shows another embodiment of the apparatus according to the present invention, which is suitably used for a brighter display in a large picture size of, e.g., A4 or larger.

The apparatus has a similar structure as the one in Fourth embodiment except that a (large) number of light sources 67 of, e.g., fluorescent lamps are disposed behind the image recording medium 55 at the display position 66, an optical system comprising a projecting plate lens 64 and a masking plate 65 is disposed between the light source and the image recording medium 55 carrying a written image which is superposed with the color filter 49.

The projecting plate lens has a function of preventing a light flux from the sources 67 from going straight on to a viewer and deflecting the light flux into a direction diverting from the viewer. The projecting plate lens 64 has masking parts 64a and the masking plate 65 has masking parts 65a, and these masking parts 64a and 65a are disposed in combination to prevent a light flux from the source from directly reaching the viewer.

As a result, glare and dazzling are removed when the image is viewed.

According to the arrangement of this embodiment, a large number of light sources 67 can be disposed closer to the back of the image recording medium at the display position 66, so that a bright image display can be effected under strong light illumination.

Further, an image display with less irregularity can be effected by uniformly arranging a large number of light sources 67 behind the image recording medium at the display position.

The projecting plate lens 64 comprises a transparent plate member of, e.g., inorganic glass or transparent plastic, the one side of which is formed in a regularly serrated surface having projections with a triangular section disposed regularly in parallel each other in a vertical direction as shown in FIG. 12B. A lower inner face of a triangular projection is used as a reflection face, on the external side of which a reflection layer 64b of, e.g., a metal paste, may be formed as desired to provide an improved projection effect and further thereon a black matted masking part 64a is formed.

The masking plate 65 comprises a transparent plate member of, e.g., inorganic glass or transparent polymer, on which are formed the masking parts 65a so as to be alternate with the masking parts 64a of the projecting plate lens 64 when combined with the plate lens 64 and to leave optical slits forming optical paths leading to the masking parts 64a.

The masking parts 64a and 65a have a surface similar to that of the light-absorbing plate 56 in the Fourth embodiment, and these parts are formed in lateral stripes with a spacing of several millimeters to several centimeters, for example, by spray coating through masks onto the respective substrates 64 and 65.

In the above embodiment, separate projecting plate lens 64 and masking plate 65 are used in combination, but these members can be united into a single member. For example, masking parts 65a can be directly formed on a flat face opposite to the serrated surface of the projecting plate lens 64.

SIXTH EMBODIMENT

In the above-described embodiments of the apparatus for color image display according to the present invention, light rays are caused to be incident to the recording layer in a direction not normal to the display face of the recording layer. As a result, in case where a color filter and an image recording medium are separately formed and disposed opposite to each other, it is possible that an alignment between the color filter pattern comprising color segments and the dots or segments of different light-scattering states of the recording layer cannot be satisfactorily performed under illumination with light due to an inevitable gap between the color filter pattern and the recording layer, and due to the thicknesses of the color filter pattern and the recording layer.

More specifically, if a light flux passing through the color filter pattern and the recording layer are incident normal to both of them, and alignment between their segments is perfect, a beautiful color image can be displayed. Actually, however, if the incident angle of a light is deviated from the normal, it is liable that a dot of a written image in the recording layer and a color segment of the color filter pattern are not aligned on a single light path due to the thickness of the color filter pattern and the recording layer and a spacing therebetween, so that a light flux is incident at a boundary between dots or segments with different degrees of light-scattering states or between a transparent dot and a light-scattering dot in the recording layer to cause crosstalk due to superposition of scattered light from the different dots.

The following embodiment of the apparatus according to the present invention provides a solution to such a problem i.e., ensures a better contrast.

Figure 13:
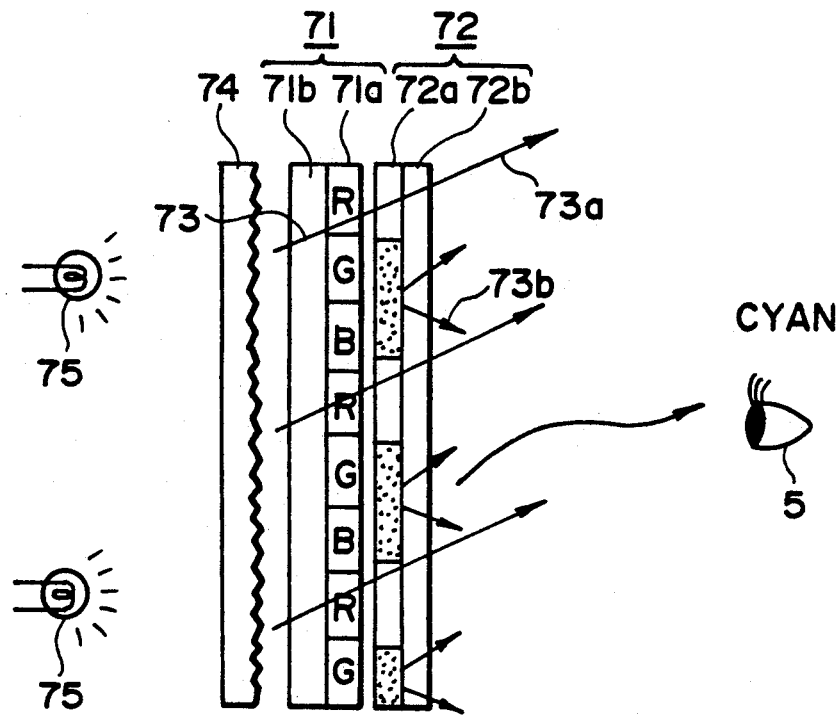

Referring to FIG. 13, the apparatus includes a color filter 71 comprising a color filter pattern 71a found on a transparent substrate 71b, an image recording medium 72 comprising a recording layer 72a formed on a transparent substrate 72b, a Fresnel lens 74 and backlight sources 75. A part of incident light 73 issued from the sources 75 and having passed through the Fresnel lens 74 is caused to go straight on to form a red light flux 73a not reaching a viewer 75. Another part of the incident light 73 is scattered at the recording layer to form a cyan light flux 73b reaching the viewer similarly as in First embodiment explained with reference to FIG. 1.

In this embodiment of FIG. 13, a transparent part is formed in the recording layer 72a in a size larger than that of a corresponding color segment (R in this case) formed in the color filter pattern 71a. As a result, a light flux 73a in a color (R) not used for display (i.e., flux corresponding to the transparent part) is reliably caused to go out of the visual field of the viewer, and the light flux 73a in a color (R) is prevented from entering a light-scattering part of the recording layer to reach a viewer at a higher degree of latitude, so that color crosstalk can be reliably prevented.

Generally, the thicknesses of the color filter pattern 71a and the recording layer 72a are on the order of 0.1-5 microns and 3-15 microns, respectively. Further, it is difficult to secure a perfect directionality of illumination light. According, in order to accomplish the above object, it is desired that the spacing between the color filter pattern and the recording layer is suppressed to 100 microns or less, more preferably 50 microns or less; the incident angle of illumination light with respect to the display face of the recording layer is set within the range of 10-70 degrees; and the size of a transparent part or dot formed in the recording layer corresponding to color segment of the color filter pattern is set to be about 110-150% in length of the size of the color segment.

If the transparent dot is smaller than the above mentioned range and comparable with that of a color segment, a non-display light flux is liable to enter a light-scattering part. As the pitch of image dots in the recording layer and the pitch of color segments in the color filter pattern are generally identical, too large a transparent dot size is not desired because it relatively lowers the size of a light-scattering dot. In the above-mentioned range, it is possible to prevent crosstalk even if the color filter pattern and the recording layer are relatively deviated from the exactly aligned position, so that the alignment becomes relatively easy.

Figure 14:
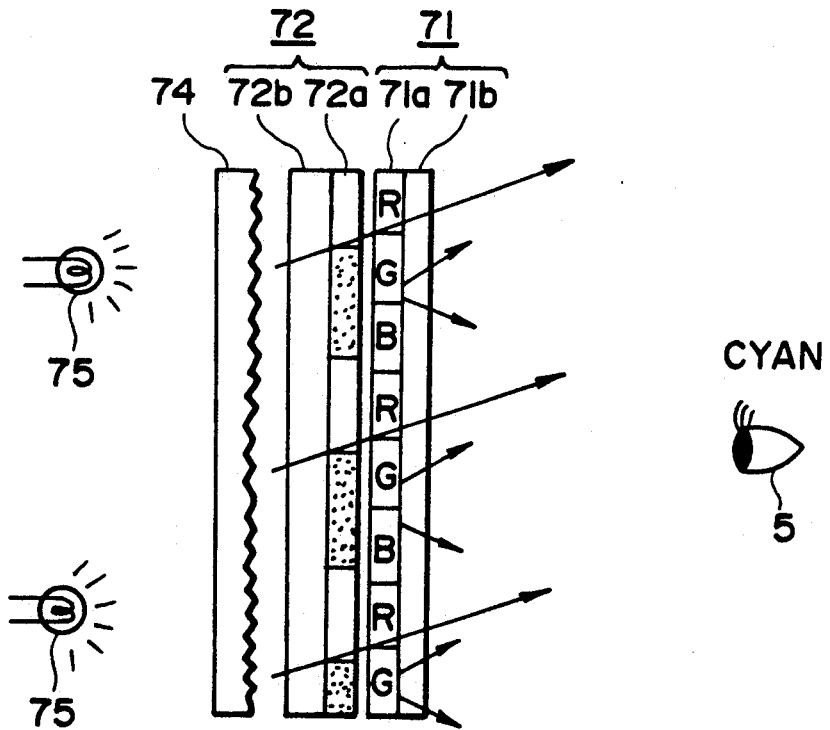

A similar consideration also applies to a case wherein an image recording medium 72 is disposed between light sources 75 and the color filter 71 as shown in FIG. 14. In this case, however, it is preferred that the size of a transparent dot in the recording layer 72a is formed relatively larger than in the case of FIG. 13 because scattered light fluxes are incident the color filter pattern 71a.

The principle of the embodiment of FIG. 13 also applies to a system using reflected light for color display as shown in FIG. 15. This embodiment includes a light source 75 comprising a lamp 75a and a lens 75b, and also a reflection layer 76 integrally formed with an image recording medium 72.

SEVENTH EMBODIMENT

As has been described before referring also to FIG. 16, a laminate or superposition of a color filter pattern 71a and a recording layer 72a is illuminated with incident light having a directionality oblique to the display face of the recording layer 72a. As a result, a light flux (R in FIG. 16) is not allowed to reach a viewer 5, and color fluxes (G and B) scattered at light-scattering parts in the recording layer reach the viewer to be recognized as a mixture of G and B, i.e. cyan which is complementary to R.

Figure 16:
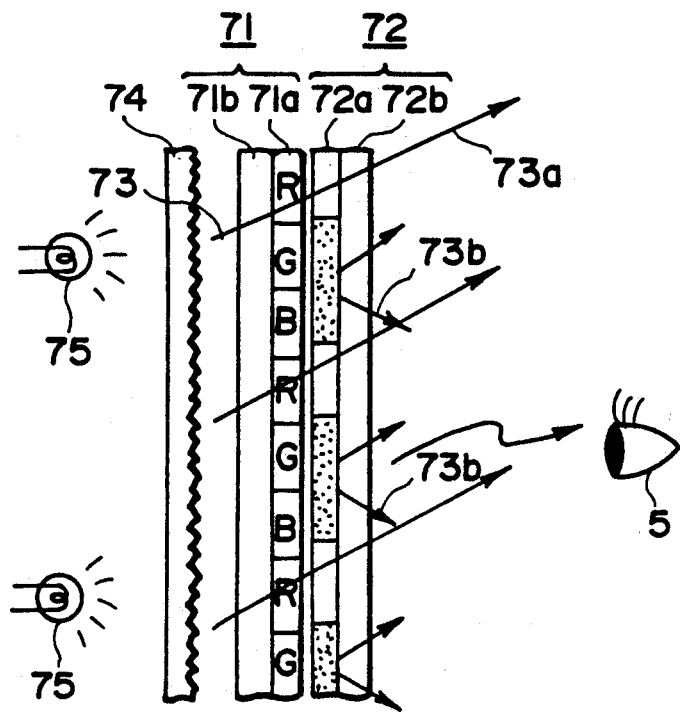

In the embodiment of FIG. 16, the image dots of the recording layer 72a are relatively deviated from those of the corresponding color segments of the color filter pattern 71a in a direction of the incidence angle of the obliquely incident, light in consideration of the magnitude of the incidence angle, the gap between the color filter pattern 71a and the recording layer 72a and the thicknesses of these, so as to successfully prevent a non-display light flux (R) from entering a light-scattering part in the recording layer and allow the non-display light flux to go out of the visual field of a viewer 5. As a result, color crosstalk is effectively prevented.

Figure 17:
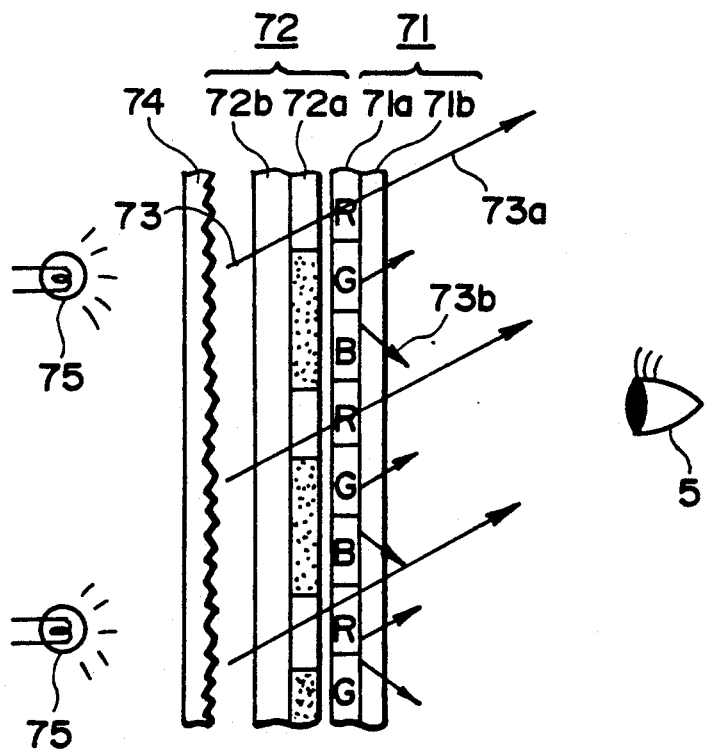

A similar effect can be obtained in the case of FIG. 17 wherein the color filter pattern 71a and the recording layer 72a are reversely arranged compared with the case of FIG. 16. In case of FIG. 17, crosstalk is prevented by preventing a scattered light flux entering a color segment in a color not to be displayed. When no transparent part is formed but the entire area of the recording layer is formed into a light-scattering state, white scattered light is visible. Further, even when the backlight system is so constructed to provide incident light entering the recording layer in a direction substantially normal to the recording layer instead of the oblique incidence described above, a similar color display with scattered light can be effected by placing a viewing position from a position rightly facing the display face.

Also in this embodiment, it is preferred to form a transparent image dot in size larger than that of the corresponding color segment in the pattern.

The system of FIG. 16 provides a mirror image and the system of FIG. 17 provides a normal image. This is because the face of the recording layer 72a is reversed.

In order to prevent a light flux passing the color filter pattern substantially linearly from entering a light-scattering part of the recording layer (FIG. 16) or to prevent a scattered light flux from entering a color segment of a color to be not displayed of the color filter pattern (FIG. 17) as described above, it is necessary to provide an appropriate degree of deviation between the color filter pattern and the recording layer.

In the case where the recording layer is situated between the light source and the color filter pattern (FIG. 17), it is desired that the above-mentioned deviation is slightly smaller than in the case of the reverse arrangement (FIG. 16).

As has been described above, according to the apparatus of the present invention, it is possible to easily effect a bright color still image with a good contrast through a simple operation, and moreover the display and erasure of an image can be repeated as desired.

What is claimed is:

1. A color image display apparatus, comprising:
   an image recording medium forming a written image with different degrees of light-scattering characteristic, said image recording medium comprising
   (a) a recording layer which comprises a material capable of selectively forming in the absence of an applied electric field a light-scattering state and a transparent state depending on thermal conditions applied thereto, and
   (b) a color filter having a pattern of plural color segments of a plurality (n) of colors operatively associated with the recording layer;
   a light source; and
   direction means for directing light from the light source to be incident on the recording layer in a direction that is not normal to said recording layer so as to display an image in light scattered from a set of color segments of the plurality (n) of colors in association with the recording layer, wherein the scattered light is of a color which is a mixture of a number (m) of said plurality of colors, wherein $1 \leq m < n$.

2. An apparatus according to claim 1, which further comprises light-absorbing means disposed behind the image recording medium during color image display.

3. An apparatus according to claim 1, wherein said recording layer comprises a polymer liquid crystal.

4. An apparatus according to claim 1, wherein said direction means comprises a Fresnel lens.

5. An apparatus according to claim 1, wherein said direction means comprises a cylindrical lens.

6. An apparatus according to claim 1, wherein said direction means comprises a combination of a projecting plate lens and a masking plate.

7. A color image display method, comprising the steps of:
   providing an image recording medium comprising a recording layer capable of selectively forming a light-scattering state and a transparent state, the recording layer being also colored in a pattern of plural color segments of a plurality (n) of colors; and
   directing light from a light source to be incident to the recording layer in a direction not normal to the recording layer, so as to display an image in light scattered from a set of color segments of the plurality (n) of colors in association with the recording layer, wherein the scattered light is of a color that is a mixture of a number (m) of said plurality of colors, wherein $1 \leq m < n$, said scattered light being complementary to the color segments.

8. A method according to claim 7, wherein said direction means comprises a projecting plate lens and a masking plate.

9. A color image display method, comprising the steps of:
   providing an image recording medium comprising a recording layer capable of selectively forming a light-scattering state and a transparent state in the absence of an applied electric field, and a color filter having a pattern of plural color segments of a plurality (n) of colors operatively associated with the recording layer; and
   directing light from a light source to be incident to the recording layer in a direction that is not normal to the recording layer, so as to display an image in light scattered from a set of color segments of the plurality (n) of colors in association with the recording layer, wherein the scattered light is of a color that is a mixture of a number (m) of said plurality of colors, wherein $1 \leq m < n$, said scattered light being complementary to the color segments.

10. A color image display method, comprising the steps of:
    providing an image recording medium comprising (a) a recording layer which comprises a material capable of forming in the absence of an applied electric field a transparent state and a light-scattering state to form a written image with different degrees of light-scatting characteristic depending on thermal conditions applied thereto, and (b) a color filter having a pattern of plural color segments of a plurality (n) of colors operatively associated with the recording layer; and directing light from a light source to be incident to the recording layer in a direction not normal to the recording layer, so as to display an image in light scattered from a set of color segments of the plurality (n) of colors in association with the recording layer, wherein the scattered light is of a color that is a mixture of a number (m) of said plurality of colors, wherein $1 \leq m < n$, said scattered light being complementary to the color segments.

11. A color image display apparatus, comprising:

an image recording medium comprising a recording layer which comprises a material capable of forming a transparent state and a light-scattering state to form a written image with different degrees of light-scattering characteristic depending on thermal conditions applied thereto, the recording layer being also colored in a pattern of plural color segments;

a light source; and direction means for directing light from the light source to be incident to the recording layer in a direction not normal to the recording layer.

12. An apparatus according to claim 11, which further comprises light-absorbing means disposed behind the image recording medium during color image display.

13. An apparatus according to claim 11, wherein said recording layer comprises a polymer liquid crystal.

14. An apparatus according to claim 11, wherein said direction means comprises a Fresnel lens.

15. An apparatus according to claim 11, wherein said direction means comprises a cylindrical lens.

16. An apparatus according to claim 11, wherein said direction means comprises a projecting plate lens and a masking plate.

17. A color image display method, comprising the steps of:

providing an image recording medium comprising a recording layer which comprises a material capable of forming a transparent state and a light-scattering state to form a written image with different degrees of light-scattering characteristic depending on thermal conditions applied thereto, the recording layer being also colored in a pattern of plural color segments of a plurality (n) of colors; and directing light from a light source to be incident to the recording layer in a direction not normal to the recording layer, so as to display an image in light scattered from a set of color segments of the plurality (n) of colors in association with the recording layer, wherein the scattered light is of a color that is a mixture of a number (m) of said plurality of colors, wherein $1 \leq m < n$, said scattered light being complementary to the color segments.

18. A method according to claim 9, wherein a light-absorbing means is disposed behind the image recording medium during color image display.

19. A method according to claim 9, wherein said recording layer comprises a polymer liquid crystal.

20. A method according to claim 9, wherein said direction means comprises a Fresnel lens.

21. A method according to claim 9, wherein said direction means comprises a cylindrical lens.

22. A method according to claim 9, wherein said direction means comprises a projecting plate lens and a masking plate.

23. A method according to claim 9, wherein, before the readout, said recording layer is caused to form a transparent segment in a size larger than that of a color segment of the color filter corresponding thereto.

24. A method according to claim 9, wherein, before the readout, said recording layer is caused to form a transparent segment in a position deviated from a color segment of the color filter with a deviation depending on the incident angle of the light to the recording layer.

25. A method according to claim 7, wherein said direction means comprises a cylindrical lens.

26. A method according to claim 7, wherein a light-absorbing means is disposed behind the image recording medium during color image display.

27. A method according to claim 7, wherein said recording layer comprises a polymer liquid crystal.

28. A method according to claim 7, wherein said direction means comprises a Fresnel lens.

29. A method according to claim 10, wherein before the readout said recording layer is caused to form a transparent segment in a size larger than that of a color segment corresponding thereto of the color filter.

30. A method according to claim 10, wherein before the readout said recording layer is caused to form a transparent segment in a position deviated from a color segment of the color filter with a deviation depending on the incident angle of the light to the recording layer.

* * * * *

UNITED STATES PATENT AND TRADEMARK OFFICE
CERTIFICATE OF CORRECTION

PATENT NO. : 5,285,298
DATED : February 8, 1994
INVENTOR(S) : SHUZO KANEKO, ET AL.

Page 1 of 3

It is certified that error appears in the above-indentified patent and that said Letters Patent is hereby corrected as shown below:

COLUMN 1

Line 11, "a" should read --an--.

COLUMN 2

Line 13, close up right margin.
Line 14, close up left margin.
Line 38, "a" should be deleted.

COLUMN 3

Line 13, "term" should read --the term--.

COLUMN 5

Line 66, "other several" should read --several other--.

COLUMN 6

Line 22, "FIG. 1A-1C." should read --FIGS. 1A-1C.--.

COLUMN 8

Line 15, "addition" should read --addition to--.
Line 59, "in" should read --in the--.

COLUMN 9

Line 57, "alignment" (second occurrence) should read --aligning--.

UNITED STATES PATENT AND TRADEMARK OFFICE
CERTIFICATE OF CORRECTION

PATENT NO. : 5,285,298
DATED : February 8, 1994
INVENTOR(S) : SHUZO KANEKO, ET AL.

It is certified that error appears in the above-indentified patent and that said Letters Patent is hereby corrected as shown below:

COLUMN 10

Line 36, "in" should read --in the--.

COLUMN 12

Line 7, "the" should read --of the--.

COLUMN 13

Line 33, "of" should read --of an--.
Line 60, "erasure" should read --erase--.

COLUMN 14

Line 6, "to be displayed moved" should be deleted.
Line 7, "to" should read --in--.
Line 9, "entirely of the" should read --entire--.

COLUMN 15

Line 37, "in" should read --in the--.

COLUMN 16

Line 9, "in" should read --in the--.
Line 26, "According," should read --Accordingly,--.
Line 34, "to color" should read --to the color--.

UNITED STATES PATENT AND TRADEMARK OFFICE
CERTIFICATE OF CORRECTION

PATENT NO.  : 5,285,298
DATED       : February 8, 1994
INVENTOR(S) : SHUZO KANEKO, ET AL.

It is certified that error appears in the above-indentified patent and that said Letters Patent is hereby corrected as shown below:

<u>COLUMN 17</u>

Line 22, "In" should read --In the--.
    Line 63, "comprising" should read --comprising:--.

Signed and Sealed this

Twenty-third Day of August, 1994

Attest:

BRUCE LEHMAN

Attesting Officer      Commissioner of Patents and Trademarks